United States Patent Office 3,001,606
Patented Sept. 26, 1961

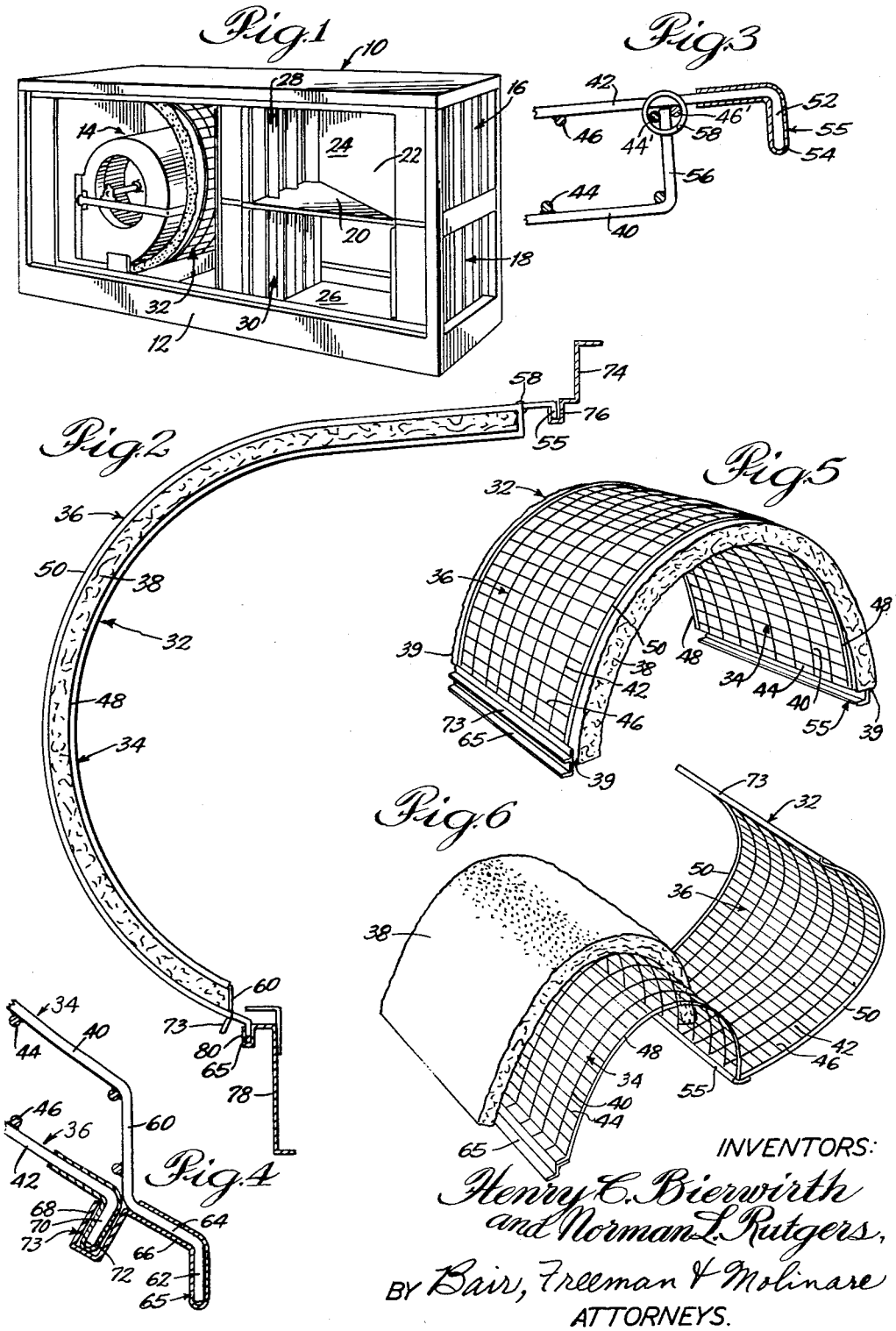

3,001,606
HAMMOCK FILTER
Henry C. Bierwirth and Norman L. Rutgers, Marshalltown, Iowa, assignors to Lennox Industries, Inc., a corporation of Iowa
Filed Apr. 21, 1958, Ser. No. 729,935
1 Claim. (Cl. 183—49)

This invention relates generally to an air filter for use in an air distribution system, and more particularly a novel hammock-type filter construction of the arcuately semi-cylindrical type.

In the use of air processing equipment for heating, cooling and ventilating systems, efficient air filtration is of great importance. In particular, such filtration must be performed by a compact and sturdy device adapted for simple and low-cost replacement of the filter media. Although many filter materials having desirable air cleaning properties are available at reasonably low-cost, most are of a fibrous, woven or fragile nature, and are incapable of unitary self-support. It is highly important to the efficient use of such filter materials in installations requiring a semi-cylindrical conformation that the filter material be lightly compressed and arcuately conformed. Although various mounting structures including semi-cylindrical frames have been suggested in the past for utilizing such filter materials, as for example R. W. Eichorn Patent No. 2,771,963, having a common assignee with the present invention, such means have not been adapted to both lightly compress and conform the filter material while at the same time enabling speedy and simple replacement of the filter media. Although conventional throw-away filters, of the type employing cardboard or other disposable-type frames, have in the past provided a reasonably low unit cost, the necessity for frequent replacement to maintain an efficient filtering surface of a desired useful area results in a continuing expense which becomes substantial for regularly operating air treatment equipment. These prior devices and procedures have necessarily been costly and time-consuming.

It is a primary object of the present invention, therefore, to provide a sandwich-type supporting rack for fiber-type filter media, wherein opposed racks for compressably supporting a mat of fibrous filter material are pivotally interconnected for separating movement to effect replacement of the enclosed filter material.

It is another object of this invention to provide a hammock filter structure for an air processing unit, wherein the filter structure is suspendingly supported within the unit cabinet in a transversely slidable manner for removal and replacement, and wherein the hammock structure comprises opposed cooperating arcuate racks for releasably enclosing a mat of fibrous filter material.

Further objects and advantages of this invention will become apparent as the following description proceeds, and the features of novelty which characterize this invention will be pointed out with particularity in the claim annexed to and forming part of this specification.

A preferred embodiment of the invention is shown in the accompanying drawing, in which:

FIGURE 1 is a perspective view of an air processing unit for heating, cooling and ventilating, utilizing the hammock filter structure of the present invention.

FIGURE 2 is a vertical cross-sectional view of the hammock filter as mounted within the cabinet enclosure of the air processing unit of FIGURE 1.

FIGURE 3 is a fragmentary, vertical cross-sectional view on an enlarged scale, showing the structural details of the upper or pivotal end of the filter structure of FIGURE 2.

FIGURE 4 is another fragmentary, vertical cross-sectional view on an enlarged scale, showing the structural details of the lower or opening end of the filter structure of FIGURE 2.

FIGURE 5 is a perspective view of the assembled filter construction, comprising opposed, pivotally-movable, arcuate racks and compressably enclosed filter material.

FIGURE 6 is another perspective view, similar to FIGURE 5, showing the racks pivotally separated for removal and replacement of the filter material.

Referring to FIGURE 1 of the drawing, we have illustrated an air processing unit 10 of a type in which the hammock filter structure of the present invention may be used. The unit 10 may comprise any suitable assembly of air treating and directing components, and for purposes of illustration we have shown an air processing unit of the type disclosed and described in detail in our copending application, Serial No. 742,393, filed June 16, 1958.

The unit 10 includes a unitary cabinet structure 12, having a supporting frame and enclosing exterior panels. A centrifugal blower unit 14 is mounted within the cabinet 12, and as shown is positioned adjacent the left-hand or air discharge end of the unit 10. Superposed upper and lower aligned series of air control dampers 16 and 18 are mounted at the right-hand or air inlet end of the unit 10. The dampers 16 and 18 are adapted for coordinated rotational movements to regulate the introduction of re-circulated room air, including both directly by-passed room air and heated room air. A horizontal deck 20 and a diagonal divider wall 22 effect a compartmentation within the cabinet structure 12 for defining a fresh air chamber 24 and a recirculated air chamber 26. Superposed upper and lower aligned series of mixing dampers 28 and 30 are mounted for coordinated movement to regulate the passage of predetermined balanced mixtures of recirculated, heated, and fresh air from the chambers 24 and 26 to the blower unit 14 for pressure discharge into a distribution duct system.

A hammock filted assembly constructed in accordance with the present invention is designated generally at 32, and is adapted to be mounted within the cabinet structure 12 upstream of the inlet to the centrifugal blower unit 14. The filter assembly 32 is of arcuately curved semi-cylindrical form, and enclosingly surrounds a substantial portion of the top, bottom and rear portions of the blower unit 14. In this way, a compact structural arrangement is provided while achieving an effective filter area of substantial size. It will be understood that a balanced mixture of various air supplies will be automatically regulated by the inlet end dampers 16, 18 and the mixing dampers 28, 30, and will be drawn forwardly through the filter assembly 32 by the blower 14 for discharge from the outlet end of the air processing unit 10.

Referring now more particularly to FIGURES 2 through 6 of the drawing, the structural details of the hammock filter assembly 32 will be described. A two-part "sandwich-type" frame of wire mesh, comprising inner and outer arcuate sections 34 and 36, serves to provide a rack for rigidly supporting and conforming a filter mat or blanket 38. The sections 34 and 36 are adapted to be nested in particularly spaced relation for lightly compressing a predetermined thickness of filter material therebetween. Although any suitable filter media may be employed, a filter mat of continuous fiber type Fiberglas, coated with a suitable viscous material such as oil to improve filtration efficiency, is preferred and may be considered typical with respect to mechanical strength and manual handling.

It is an important feature of this invention that the transverse width of the filter mat 38 be greater than the widths of the enclosing arcuate frame sections 34 and 36 so as to provide an edge overlap or lateral projection of filter material at each side of the assembly 32. When mounted within the cabinet structure 12 of an air processing unit, the projecting side edges 39 of the filter mat 38 will cooperatingly engage, and be lightly compressed by, suitable side enclosure panels of the cabinet structure 12 to provide an edge seal. In this way, the full internal width of the cabinet structure 12 is utilized to present effective filter surface to the flow of air into the blower. This utilization of maximum internal width, together with the arcuate shape of the filter assembly, enables the achievement of a maximum effective filter area with a minimum amount of filter material. Because of its open mesh nature, the supporting frame structures do not obstruct, and render ineffective for filtering purposes, any substantial portion of the filter mat 38.

The wire mesh sections 34 and 36 include longitudinal arcuate lengths of widely spaced wires 40 and 42, respectively, and transverse straight lengths of widely spaced wires 44 and 46, respectively. The wire mesh thus formed is of such size and spacing as to provide a substantially "fully open" rack structure characterized by a virtually zero total area of obstruction or opposition to air flow through the filter mat 38. In order to provide a trim and readily handled configuration, side hems 48 and 50 are provided by sheet metal strips bent back against themselves in generally U-shape form and bound to the free ends of the transverse straight wires 44 and 46.

The free ends of the longitudinal arcuate wires 42 of the section 36 are bent transversely inwardly at right angles to provide terminal hook ends 52 at the upper end portion of the assembly 32 (see FIGURE 3). The plurality of hook ends 52 are enclosed within a sheath 54, formed by a sheet metal strip bent back against itself in a manner similar to the formation of the side edge hems 48 and 50, so as to provide an end flange 55. The adjacent terminal ends of the longitudinal arcuate wires 40 of section 34 are similarly bent transversely inwardly to provide hook ends 56 spaced substantially short of the hook ends 52. The adjacent transverse straight wires of the respective arcuate sections 34 and 36 located at the point of immediate adjacency between the hook ends 56 and the arcuate wires 42 are indicated at 44' and 46' in FIGURE 3 of the drawing. A plurality of "hog rings" 58 are looped around the transverse wires 44' and 46' at selected points along the transverse widths of the sections 34 and 36 so as to effect a freely pivotally movable interconnection between the two arcuate sections 34 and 36 of the frame structure. In this way, the opposite or free ends of the arcuate sections 34 and 36 may be pivoted toward and away from each other in the manner of the pages of a loose leaf book binder, as will be apparent from a comparison of FIGURES 5 and 6 of the drawing.

The opposite or freely separable ends of the arcuate sections 34 and 36 also provide a particular structural configuration, and serve to enable locking inter-engagement of the two sections in spaced-apart relation. As best seen in FIGURE 4 of the drawing, the free ends of the longitudinal arcuate wires 40 of section 34 are formed with double transverse angle bends 60, 62 and an intermediate section 64. The terminal projecting bend 62 extends substantially beyond the adjacent curved surface of the arcuate section 36 when the sections 34 and 36 are in nested relation. A sheath 66, formed by a sheet metal strip bent back against itself in the manner of hems 48 and 50, serves to enclose the bent portions 62 and 64 and provide an end flange 65. The sheath 66 further serves to provide an inwardly open lock channel 68 extending outwardly beyond the adjacent curved surface of the arcuate section 36 when nested.

The adjacent terminal ends of the longitudinal arcuate wires 42 of section 36 are transversely bent outwardly to provide hook ends 70. A sheath 72, also formed of a suitably bent sheet metal strip, encloses the hook ends 72 to define a lock flange 73. The lock flange 73 is adapted to be received within the channel 68 of the sheath 66 carried by the free ends of the wires 40 of section 34. In this way, a releasable locking means is provided for coupling the free ends of the pivoted sections 34 and 36. The lock may be readily manually set and released by slight bending movements of the sections 34 and 36 so as to pivot the lock flange 73 into and out of the channel 68.

A suitable upper end mounting bracket 74 is fixedly suspended from the upper frame and top panel portions of the cabinet structure 12, and is formed so as to define an upwardly open support channel 76. A lower end mounting bracket 78 is similarly fixed to the bottom frame and panel portions of the cabinet 12, and is formed so as to define a second upwardly open support channel 80. As best seen in FIGURE 2, the lower channel 80 is located substantially forwardly of the upper channel 76. In this way, the end flanges 55 and 65 are adapted to be received within the upper and lower support channels 76 and 80, respectively. It is contemplated that the channels 76 and 80 will be open at their side ends so that the entire filter assembly 32 as supported by its end flanges 55 and 65 may be slidably inserted in the support channels 76 and 80, and moved into the interior of the cabinet structure 12.

In order to change the filter material when desired, it is merely necessary to slide the entire assembly 32 transversely out of the cabinet structure 12 along the support channels 76 and 80 thereof, release the locked ends of the arcuate sections 34 and 36 by removal of lock flange 73 from the lock channel 68, effect pivotal opening movement of the sections 34 and 36, and then freely remove the soiled filter material 38. Replacement filter material may be stored in continuous blanket lengths of about one inch thickness and of sufficient predetermined width for edge overlap when disposed within the supporting rack structure. Such material compresses readily, so that a twenty foot length may be squeezed into a roll about six inches in diameter. These rolls may then be stored within dispensing type cartons, much in the manner of wax paper in the kitchen. It is merely necessary to withdraw or unroll the desired length for one filter, cut it off transversely with a knife or scissors, lay it into the "sandwich" type wire rack, move the arcuate sections pivotally toward each other, effect locking of the free ends of the rack to compress the filter material therebetween, and then slidably re-insert the entire hammock filter assembly and its renewed filter mat within the support channels of the cabinet structure.

While there has been shown and described a particular embodiment of this invention, it will be obvious to those skilled in the art that various changes and modifications may be made therein without departing from the invention and, therefore, it is intended in the appended claim to cover all such changes and modifications as fall within the true spirit and scope of the invention.

What we claim as new and desire to secure by Letters Patent of the United States is:

In combination with an air processing unit having a housing and a blower mounted therein, a filter assembly comprising a first arcuately-shaped semi-cylindrical wire mesh rack including first longitudinal arcuate wires, the opposite ends of said first wires being bent to provide hook ends on said first rack, first sheath members enclosing the respective hook ends to provide end flanges on said first rack, a second arcuately-shaped semi-cylindrical wire mesh rack including second longitudinal arcuate wires, the opposite ends of said second wires being bent transversely inwardly for assembling said first and second racks together in nested spaced-apart relation, means pivotally connecting said second wire bent ends at one end of said second rack to said first wires proximate to and inwardly of one said flange on said first rack, a second sheath member enclosing said second wire bent ends at the remaining end of said second rack to provide an end flange on said second rack, a lock channel formed in said second sheath member adapted to receive the remaining said flange on said first rack, a mat of compressible filter material having an uncompressed thickness normally greater than the spacing between said racks and disposed between said racks, the lateral width of said filter material being greater than the width of said racks, said racks when locked in nested, spaced-apart relation serving uniformly to lightly compress and conform said filter material therebetween in arcuately semi-cylindrical form with the arcuate side edges thereof projecting laterally beyond the sides of said racks, said racks when unlocked and pivotally separated permitting free removal and replacement of said filter material, a pair of support channels carried by said housing for mounting said filter assembly in the air flow path to said blower, one said support channel being adapted to transversely slidably receive therein said one flange on said first rack, and the remaining said support channel being adapted to transversely slidably receive therein said flange on said second rack, for laterally removable and replaceable mounting of said filter assembly in arcuately surrounding relation to said blower.

References Cited in the file of this patent
UNITED STATES PATENTS

| | | |
|---|---|---|
| 1,544,690 | Shurtleff | July 7, 1925 |
| 2,057,568 | Gerard | Oct. 13, 1936 |
| 2,182,501 | Qwave et al. | Dec. 5, 1939 |
| 2,771,963 | Eichorn | Nov. 27, 1956 |